Aug. 7, 1962　　　L. G. BOBROWSKI　　　3,047,920
FASTENER
Filed April 18, 1960

INVENTOR.
LOUIS G. BOBROWSKI
BY
Lindsey, Prutzman & Hayes
ATTORNEYS

United States Patent Office 3,047,920
Patented Aug. 7, 1962

3,047,920
FASTENER
Louis G. Bobrowski, Berlin, Conn., assignor to The
Stanley Works, New Britain, Conn., a corporation of
Connecticut
Filed Apr. 18, 1960, Ser. No. 22,937
4 Claims. (Cl. 24—73)

The present invention relates to clip fasteners of the type adapted to be engaged on a supporting panel for securing moldings or other decorative and accessory materials thereto.

It is an object of the present invention to provide an improved and high-strength clip fastener for moldings and the like which is readily engageable on a supporting panel by deformation of a portion thereof and which is simply and economically fabricated.

It is also an object to provide such a sheet metal fastener which is free from weakening transverse incisions and which may be conformed readily to the contour of the supporting panel.

Another object is to provide a unitary self-sealing fastener assembly having a resilient sealing member on such a base metal clip which is deformable into sealing engagement with the areas around the aperture in the base panel.

A further object is to provide such a clip fastener having a readily deformable fastening portion and engageable in an aperture of a supporting panel which has molded thereon a resilient plastic sealing member which is deformable without rupture for providing a substantially liquid- and air-tight seal about the aperture.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
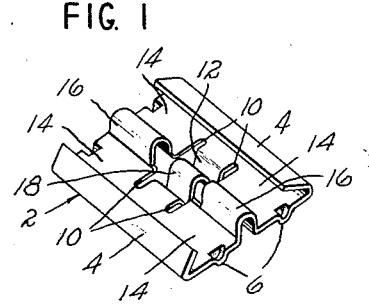
FIG. 1 is a perspective view of a metal fastener formed in accordance with the present invention.
Figure 2:
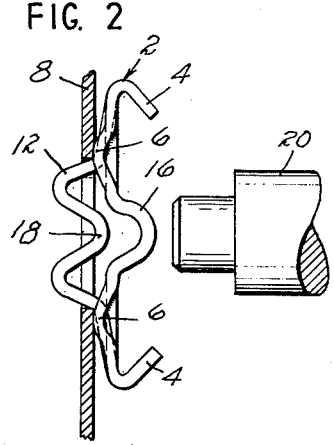
FIG. 2 is an enlarged side view of the metal fastener as disposed in an aperture of a supporting panel prior to insertion of the deforming tool.

Referring first to FIGS. 1–2 of the attached drawing, therein illustrated is an exemplary base fastener of the present invention which is fabricated from a sheet metal plate generally designated by the numeral 2. The ends of the fastener are provided with upstanding flanges 4 which taper outwardly and then inwardly to form spring arms which may be snapped into engagement with suitably configured moldings or other decorative members. The sides of the fastener are desirably staked to provide feet 6 for spacing the fastener outwardly from the supporting panel 8, although the necessity for such feet will be dependent upon the actual contour of the panel.

Two cut-outs 10 extend in parallel spaced relationship an equivalent distance to provide a central fastening strap 12 and continuous bridge portions 14 along the sides. The fastener is deformed transversely intermediate its length to provide upstanding transverse ridges 16 in the bridge portions 14 and an upstanding transverse ridge 18 in the fastening strap 12, the effect of the ridges 16 in the bridge portions 14 being to shorten the longitudinal distance of the cut-outs 10 and to increase the strength of the fastener while simultaneously providing additional metal in the fastening strap 12 for ready elongation or longitudinal deformation of the depending strap within the elastic limits of the metal, thus preserving the inherent strength of the metal.

Figure 3:
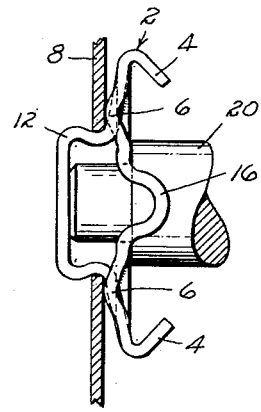
FIG. 3 is the metal fastener of FIG. 2 after deformation.

The end portions of the fastening strap 12 are bent downwardly so that the strap is disposed generally below and depends from the body of the fastener to assume a substantially W-shaped configuration. As shown in FIGS. 2 and 3, the fastening strap 12 is inserted into an aperture in the supporting panel 8, and is then deformed by flattening the ridge 18 with a punch 20 or similar tool into a generally U-shaped configuration and to project the depending portions of the fastening strap 12 longitudinally outwardly into frictional engagement with the sides of the aperture and somewhat outwardly of the aperture on the underside of the panel, thus securing the fastener firmly thereto.

If it is desired to disengage the fastener from the panel, a V-shaped punch or similar tool can be driven against the center of the now U-shaped fastening strap 12 to bend it further into a V-shaped configuration and compress it longitudinally, thus permitting withdrawal from the aperture.

Figure 5:
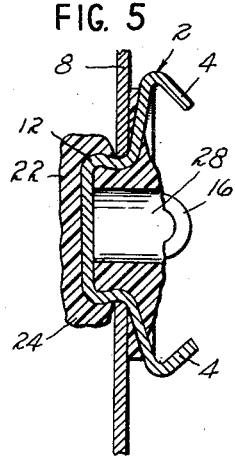
FIG. 5 is the fastener of FIG. 4 after deformation.
Figure 4:
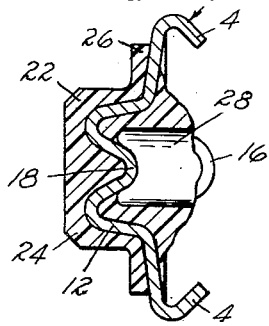
FIG. 4 is a cross-section of the metal fastener with sealing material molded thereon prior to deformation.

Since it is generally desirable that the aperture in the supporting panel 8 be sealed against passage of liquids, dirt, gases, etc., the preferred fastener of the present invention is provided with a resilient sealing member 22 as shown in FIGS. 4 and 5. As best shown in FIG. 4, the previously formed metal fastener has molded thereto the sealing member 22 which has a body portion 24 completely surrounding and embedding the fastening strap 12 and a peripheral flange 26 extending along the bottom surface of the fastener outwardly of the cut-outs 10 to provide a configuration generally resembling an inverted hat. The molded sealing member 22 extends upwardly into the ridges 16 so that the fastening strap 12 and cut-outs 10 are completely surrounded on the bottom surface of the fastener by the resilient member 22 and so that the flange 26 thereof will overlap the aperture in the panel 8.

To prevent rupturing of the sealing member due to the extensive deformation of the fastening strap 12 and sealing member 22 required for engagement in the aperture, it has been found necessary to provide a well or cavity 28 in the upper portion of the sealing member 22 which extends downwardly to and somewhat below the crest of the ridge 18 of the fastening strap 12. As illustrated, the cavity 28 is preferably of cylindrical cross section and serves to receive and align the deforming punch or tool 20. By providing the cavity 28, distortion of the sealing member 22 by the tool 20 is minimized and rupturing is substantially eliminated while increasing the deformability of the structure.

As shown in FIG. 5, upon deformation of the strap 12 into engagement with the panel 8, the body portion 24 of the sealing member forms an effective seal around the fastening strap 12 itself and between the fastening strap and the bottom surface of the panel 8 around the aperture, and the flange 26 provides a seal between the fastener and the top surface of the panel around the aperture.

As is readily apparent, the fastener of the present invention is readily and economically fabricated from sheet metal stock having the desired properties of strength and suitable resilience. The cut-outs 10 are initially blanked out and then the fastener is bent into its desired configuration. After the base fastener has been formed, the sealing member is integrally formed by molding a resilient plastic material thereon in a suitably configurated mold. Although the well 28 may be provided by the mold itself, it has been found most desirable to form the plastic as a solid mass and then to insert a heated tool of the desired configuration to melt or burn out the cavity. This method also has the effect of toughening the skin of the sealing member and rendering it even less susceptible to rupturing.

Of the various resilient plastics which may be utilized, foamed unicellular plastisols have been found most desirable because of factors of cost, ease of molding, resilience and durability. In particular, vinyl plastisols such as vinyl chloride have been highly satisfactory.

It can be seen that the structure of the present invention is economical to manufacture and use and is readily adaptable to automation in assembly to a supporting panel. The structure is rugged and free from transverse incisions which would detract from its strength while the upstanding ridges in the bridge portions contribute to the overall strength of the clip. The structure is readily adaptable to various contours of the supporting panels and can be used for securing various kinds of suitably configured decorative members. The resilient sealing member is readily molded onto the clip to provide a unitary self-sealing fastener which is assembled to the panel as a single unit and provides a highly effective seal about the aperture.

As will be apparent to persons skilled in the art, various modifications and adaptations of the structure above described will become readily apparent without departure from the spirit and scope of the invention, the scope of which is defined in the appended claims.

I claim:

1. An integrally formed metal clip for securing moldings and the like to a supporting panel comprising a metal plate having means for engaging moldings and the like, said metal plate having a pair of laterally spaced cut-outs of substantially equal length and with their termini in substantial alignment to provide a fastening strap therebetween and continuous bridge portions along the sides of the metal plate, said fastening strap being disposed generally below the remainder of said metal plate and having a generally W-shaped configuration, the continuous bridge portions of said metal plate being ridged transversely intermediate the ends thereof to reduce the longitudinal distance between the ends of the cut-outs, said fastening strap being adapted to be inserted in an aperture of a supporting panel and to be deformed longitudinally outwardly into engagement with the panel by depression of the ridge portion thereof.

2. An integrally formed metal clip for securing moldings and the like to a supporting panel comprising a substantially rectilinear sheet metal plate having upstanding end portions for engaging moldings and the like, said metal plate having a pair of laterally spaced cut-outs of substantially equal length extending parallel to the sides of said sheet metal plate but not to the ends thereof and with their termini in substantial alignment to provide a fastening strap therebetween and continuous bridge portions along the sides thereof, said fastening strap having its end portions extending downwardly from the remainder of the sheet metal plate and having a transverse ridge intermediate its length to form a generally W-shaped configuration, the continuous bridge portions of said metal plate having upstanding transverse ridges intermediate the ends thereof to reduce the longitudinal distance between the ends of the cut-outs and to provide a readily expansible fastening strap, said fastening strap being adapted to be inserted in an aperture of a supporting panel and to be deformed longitudinally outwardly into engagement with the panel by depression of the ridge portion thereof.

3. A self-sealing clip for securing moldings and the like to a supporting panel comprising a metal plate having means for engaging moldings and the like, said metal plate having a pair of laterally spaced cut-outs of substantially equal length and with their termini in substantial alignment to provide a fastening strap therebetween and continuous bridge portions along the sides, said fastening strap being disposed generally below the remainder of said plate-like member and having a generally W-shaped configuration, the continuous bridge portions of said metal plate being ridged transversely intermediate the ends thereof to reduce the longitudinal distance between the ends of the cut-outs; and a resilient sealing member having a body portion completely surrounding the fastening strap and having a flange portion extending therefrom along the bottom surface of the metal plate outwardly of the cut-outs, said fastening strap and body portion of the sealing member being adapted to be inserted into an aperture of a supporting panel and to be deformed longitudinally outwardly into engagement with the panel by depression of the ridge portion of the strap with the flanged portion of the sealing member providing a seal between the metal plate and the upper surface of the panel outwardly of the aperture and the body portion of the sealing member providing a seal between the fastening strap and the bottom surface of the panel outwardly of the aperture.

4. A unitary self-sealing clip for securing moldings and the like to a supporting panel comprising a substantially rectilinear sheet metal member having upstanding portions for engaging moldings and the like, and having a pair of laterally spaced cut-outs of substantially equal length extending in parallel spaced relationship but not to the ends thereof and with their termini in substantial alignment to provide a fastening strap therebetween and continuous bridge portions along the sides of the sheet metal member, said fastening strap having end portions extending downwardly from the remainder of the sheet metal member and having a transverse ridge intermediate its length to form a generally W-shaped configuration, the continuous bridge portions of said sheet metal member having upstanding transverse ridges intermediate the ends thereof to reduce the longitudinal distance between the ends of the cut-out portions and to provide a readily expansible fastening strap; and a resilient sealing member molded onto said sheet metal member and having a body portion of generally cylindrical configuration embedding the depending fastening strap and a peripheral flanged portion extending from the body portion along the bottom surface of the sheet metal member outwardly of the cut-outs, said body portion of the sealing member having a well extending from the upper surface thereof to the ridge of the strap, said fastening strap and body portion of the sealing member being adapted to be inserted into an aperture of a supporting panel and to be deformed longitudinally outwardly into engagement with the panel by depression of the ridge portion of the strap with the flanged portion of the sealing member providing a seal between the sheet metal member and the upper surface of the panel outwardly of the aperture and the body portion of sealing member providing a seal between the fastening strap and the bottom surface of the panel outwardly of the aperture.

References Cited in the file of this patent

UNITED STATES PATENTS

| 2,746,111 | Chvosta | May 22, 1956 |
| 2,862,267 | Parkin | Dec. 2, 1958 |
| 2,889,600 | Brown | June 9, 1959 |
| 2,893,671 | Flora et al. | July 7, 1959 |
| 2,900,687 | Cochran | Aug. 25, 1959 |
| 2,967,556 | Jaworski | Jan. 10, 1961 |

FOREIGN PATENTS

| 792,444 | Great Britain | Mar. 26, 1958 |
| 816,359 | Great Britain | July 8, 1959 |